United States Patent [19]

Yopp et al.

[11] Patent Number: 5,123,497
[45] Date of Patent: Jun. 23, 1992

[54] AUTOMOTIVE APPARATUS AND METHOD FOR DYNAMICALLY DETERMINING CENTRIPETAL FORCE OF A VEHICLE

[75] Inventors: Wilford T. Yopp, Canton; Sam M. Mackool, Berkley, both of Mich.

[73] Assignee: Ford Motor Company, Dearborn, Mich.

[21] Appl. No.: 631,120

[22] Filed: Dec. 20, 1990

[51] Int. Cl.⁵ .......................... B62D 5/06; G06F 7/00
[52] U.S. Cl. ..................................... 180/142; 280/707; 280/689; 364/424.01
[58] Field of Search ............... 180/141, 142, 170; 280/689, 772, 707; 364/424.01

[56] References Cited

U.S. PATENT DOCUMENTS 4,754,828  7/1988  Morishita ..................... 180/79.1
4,882,693  11/1989  Yopp ............................ 280/707

FOREIGN PATENT DOCUMENTS 0081870  4/1986  Japan .......................... 180/142

Primary Examiner—Kenneth R. Rice
Assistant Examiner—Paul Dickson
Attorney, Agent, or Firm—Raymond L. Coppiellie; Roger L. May

[57] ABSTRACT

An apparatus and method for determining the centripetal force of an automotive vehicle operating on a roadway includes a vehicle speed measuring mechanism and a steering force measuring mechanism. Information regarding vehicle speed and steering force are fed into a processor which determines the centripetal force of the vehicle.

21 Claims, 5 Drawing Sheets

AUTOMOTIVE APPARATUS AND METHOD FOR DYNAMICALLY DETERMINING CENTRIPETAL FORCE OF A VEHICLE

BACKGROUND OF THE INVENTION

1. Field of the Invention

This invention relates to a vehicular apparatus and method for determining the centripetal force of a vehicle. More particularly, the present invention relates to an apparatus and method for dynamically determining the centripetal force of a vehicle requiring only the measurements of vehicle speed and steering force.

2. Disclosure Information

When a moving vehicle negotiates a turn, the centripetal force of the vehicle attempts to keep the vehicle in its circular path while inertia forces urge the vehicle to continue in a straight line. During the turn, the center of gravity of vehicle begins to accelerate in a lateral direction generally perpendicular to the longitudinal axis of the vehicle. Friction between the vehicle road wheel and the surface upon which the vehicle travels acts to keep the vehicle in the turn. However, at a given vehicle velocity, if the inertia acting on the turning vehicle exceeds the centripetal force required to keep the vehicle in the turn and the lateral acceleration of the vehicle exceeds the friction forces between the road wheels and the road, the road wheels begin to slip away from the direction of the turn, creating a potentially dangerous condition and requiring responsive action from either automatic systems within the vehicle or from the vehicle operator. It is therefore desirable to determine the centripetal force of the vehicle to initiate responsive actions of the vehicle before the threshold value is exceeded and a potentially dangerous situation is encountered. Typical responsive action may be the employment of a traction control system or an antilock braking system or the indication to the driver of a warning device within the vehicle.

Furthermore, when the lateral acceleration of the vehicle exceeds a predetermined limit, the vehicle undergoes undesirable body roll, thereby redistributing the weight of the vehicle toward the wheels that are radially outward of the steering center of the vehicle. When both the front wheels or both rear wheels are deflected by roll, the roll-steer effect can be pronounced. The result is a vehicle which is less comfortable for the occupants of the vehicle. It is also desirable to determine the lateral acceleration or centripetal force of the vehicle so that variable rate shock absorbers or an active or semi-active suspension system can be employed prior to exceeding a predetermined limit to negate these undesirable affects of body roll.

Many systems have been proposed which determine when a predetermined limit related to the road tire adhesion of a vehicle has been exceeded. For example, my U.S. Pat. No. 4,882,693 discloses a system for determining the road adhesion of a tire installed on a road wheel of a vehicle operating on a road way. The system uses a turn angle sensor, a vehicle velocity sensor and a steering force sensor to determine when a predetermined road adhesion value has been exceeded. The turn angle sensor of the '693 patent is used in conjunction with a find center algorithm to determine the center steering position of the steering wheel used to determine when the vehicle is turning. However, during long turns, such as during a cloverleaf turn onto a freeway, the steering angle sensor may assume an incorrect center steering position and thereby miscalculate whether the vehicle is turning. If such a mistake occurs, the vehicle will not assume that any centripetal force or lateral acceleration is acting on the vehicle and responsive actions will not be initiated. Furthermore, if the vehicle is traveling on a low coefficient of mu surface, such as ice, a vehicle operator may be turning the wheel rapidly but minimal centripetal force is developed on the car. In such a case, the '693 system may initiate responsive action, such as the switching of the shock absorbers to a firm setting to counteract body roll when in fact no body roll is present and no switching necessary due to the low mu surface. It is desirable to keep the vehicle shock valving in a soft setting when traveling on low coefficient of friction surfaces and prior to any centripetal force buildup so that roadwheel traction is increased and vehicle steerability is not degraded. Therefore, there is a need to develop a system which does not rely on a turn angle sensor to determine the centripetal force of a vehicle. Other systems also propose the use of a turn angle sensor to determine road responsive conditions acting upon the vehicle. For example, U.S. Pat. Nos. 4,621,833; 4,629,025; 4,652,010; 4,660,853; 4,666,013; 4,687,223; and 4,747,055 all rely on turn angle sensors and are subject to the same potential miscalculations as the '693 patent.

Other systems have been proposed which utilize various operating parameters in determining whether to initiate responsive action. For example, U.S. Pat. No. 4,463,936 discloses an apparatus for controlling the friction between the leaf springs of an automobile. The apparatus relies solely upon the pressure developed in the power steering assembly to determine whether to clamp the leaf springs to alter the ride of the vehicle. The apparatus does not utilize vehicle speed as a parameter in determining whether to clamp the leaf springs, resulting in degraded vehicle ride quality when unnecessary clamping of the vehicle occurs due to steering maneuvers at low speeds, such as during parallel parking or other parking lot maneuvers. Other proposed systems rely on other various parameters such as U.S. Pat. Nos. 3,552,517 and 4,796,720 in determining when to initiate responsive action.

U.S. Pat. Nos. 3,893,330; 4,050,290; 4,212,063; and 4,779,447 as well as Russian Patent No. 1153-273 all disclose systems for determining the coefficient of friction between the road wheels of the vehicle and the surface upon which the vehicle is traveling and all rely on various vehicle operating parameters. None of these patents disclose a system for determining centripetal force exerted on a vehicle as will be discussed below. Furthermore, none of these patents teaches or suggests the use solely of the vehicle parameters of vehicle velocity and steering force in determining the centripetal force or lateral acceleration of the vehicle. Therefore, vehicle speed is a necessary parameter to consider when determining the centripetal force or lateral acceleration of a vehicle.

The present invention solves the above problems by utilizing only the parameters of vehicle velocity and force to determine the centripetal force on the vehicle.

It is an advantage of the present system that the ability to determine centripetal force is not effected by tire wear or by the type of tire employed.

It is a further advantage of the present invention that a centripetal force measuring system according to this invention could be used in conjunction with a driver warning system, a brake control system, a suspension control system, a vehicle speed control system, a steering gear power assist control system, or yet other types of vehicular systems.

It is a still further advantage of the present system that this system can compensate for different loading conditions of the vehicle, since the mass of the vehicle directly relates to centripetal force exerted on the vehicle.

Other objects, features, and advantages of the present invention will become apparent to those skilled in the art to which this invention pertains.

SUMMARY OF THE INVENTION

An apparatus for determining the centripetal force of an automotive vehicle operating on the roadway includes vehicle speed measuring means comprising means for producing a first signal representing the speed at which the vehicle is being operated. An apparatus according to this invention further includes steering force measuring means comprising means for producing a second signal representing the steering force required to operate the steering system of the vehicle at a measured vehicle speed as well as processor means for determining the centripetal force of the vehicle. The processor means comprises means for receiving the first and second signals as previously described, and means for deriving from the signals a third signal representing the magnitude of centripetal force. The processor means may determine centripetal force by matching measured vehicle speed and steering force with one of a plurality of reference pairs comprising vehicle speed and steering force values where each of such reference pairs corresponds to a predetermined value of centripetal force. Each pair has a corresponding value for a third signal related to centripetal force. Accordingly, the processor may comprise a read-only memory containing the reference pairs and third signal values. Alternatively, the processor means may determine centripetal force by operating upon the first and second signals with a mathematical function contained in the processor, to thereby derive such third signal.

In another embodiment of the invention, an emergency operating apparatus for determining the centripetal force of an automotive vehicle operating on a roadway comprises vehicle speed and steering force measuring means and processor means as previously described, as well as emergency control means responsive to a signal generated by the processor in the event the measured centripetal force is greater than a threshold value. The emergency control means comprises means for operating an emergency control apparatus which may include means for regulating the operation of a brake system incorporated in the vehicle, or means for warning the driver of the vehicle that centripetal force is greater than a threshold value, or means for limiting the maximum speed or forward acceleration of the vehicle. An emergency control system according to the present invention may also include means for operating an adjustable suspension system including variable damping or spring rate characteristics.

The present invention also provides a method for initiating a control apparatus within the vehicle, the method comprising the steps of measuring the vehicle speed and steering force required to turn the roadwheels of the vehicle. The method further comprises the steps of entering the measured values into a processor means and comparing the measured values to one of a plurality of reference pairs of vehicle speed values and steering force values wherein each one of said reference pairs corresponds to a predetermined centripetal force value. The method also includes the step of initiating a control system within the vehicle when the centripetal force value exceeds a predetermined limit.

There is also disclosed herein a method for controlling a steering assist device of a power steering system within an automotive vehicle comprising the steps of measuring vehicle speed and steering force. The method further comprises the steps of determining the required steering assist based upon the measured vehicle speed and steering force values and adjusting the steering assist device to meet the required value.

DETAILED DESCRIPTION OF THE PREFERRED EMBODIMENTS

Vehicle operation may be enhanced if centripetal force on the vehicle can be dynamically determined for any particular road condition. The present invention teaches that it is possible to do this if the vehicle's speed and steering effort are known, because for a given speed, the magnitude of the steering effort is proportional to the amount of centripetal force on the vehicle resulting, in part, from friction or adhesion developed between the tire and the road surface. By feeding back the parameters of vehicle speed and steering effort into lookup tables contained within the read-only memory (ROM) of a microprocessor, for example, the centripetal force on the vehicle can be determined and adverse ride and steering effects can be limited or prevented.

Figure 5:
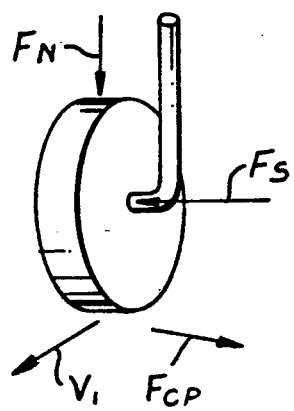
FIG. 5 is a free body diagram illustrating several of the forces acting upon a road wheel and tire assembly during a turning maneuver.

FIG. 5 illustrates the various parameters with which an apparatus according to this invention operates. Velocity, V, is a measure of the forward velocity of the vehicle. Normal force, $F_N$, is the force usually associated with the vehicle's weight, which acts downwardly through the road wheel and tire. Steering force, $F_S$, is a measure of the force required to maintain the steering road wheels at any particular steering angle value. Finally, centripetal force, $F_{Cp}$, is a measure of the force required to keep a turning vehicle in the turn on the roadway.

Information from a system according to the present invention may be used to control a variety of vehicle functions. For example, the driver may be warned that centripetal force is greater than a threshold value. In other words, the driver may be warned that the traction between the road surface and the tire is on the verge of tire slippage. A system according to the present invention may also be used for directly intervening into the operation of the vehicle by limiting the maximum speed or forward acceleration of the vehicle. In the event that a vehicle having the present system is equipped with an adjustable suspension system including, for example, variable damping capability, or variable spring rate capability, or both, it may be desirable, in the event that centripetal force is low, to limit the adjustability of the suspension system. This could involve, for example, operation of a suspension system in only a soft damping level as opposed to a firm or normal damping level. Finally, a centripetal force measuring system according to the present invention could be used to control the amount of boost provided by a power steering system. This feature could be used to give the vehicle's driver increased feedback of road conditions during episodes of adverse weather.

Figure 1:
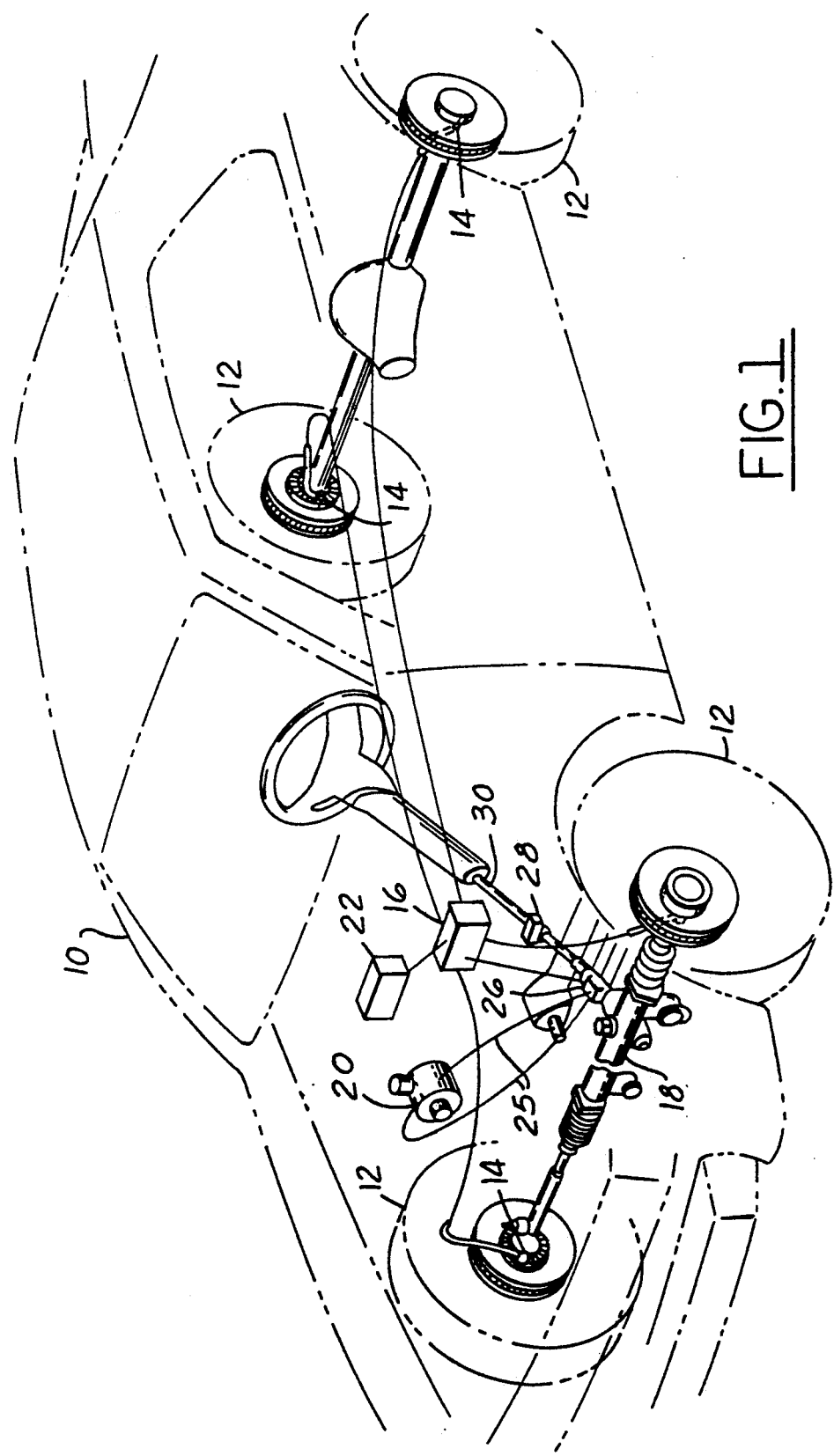
FIG. 1 is a perspective drawing of a motor vehicle incorporating the present invention. This figure shows the components of an apparatus embodying the present invention.
Figure 2:
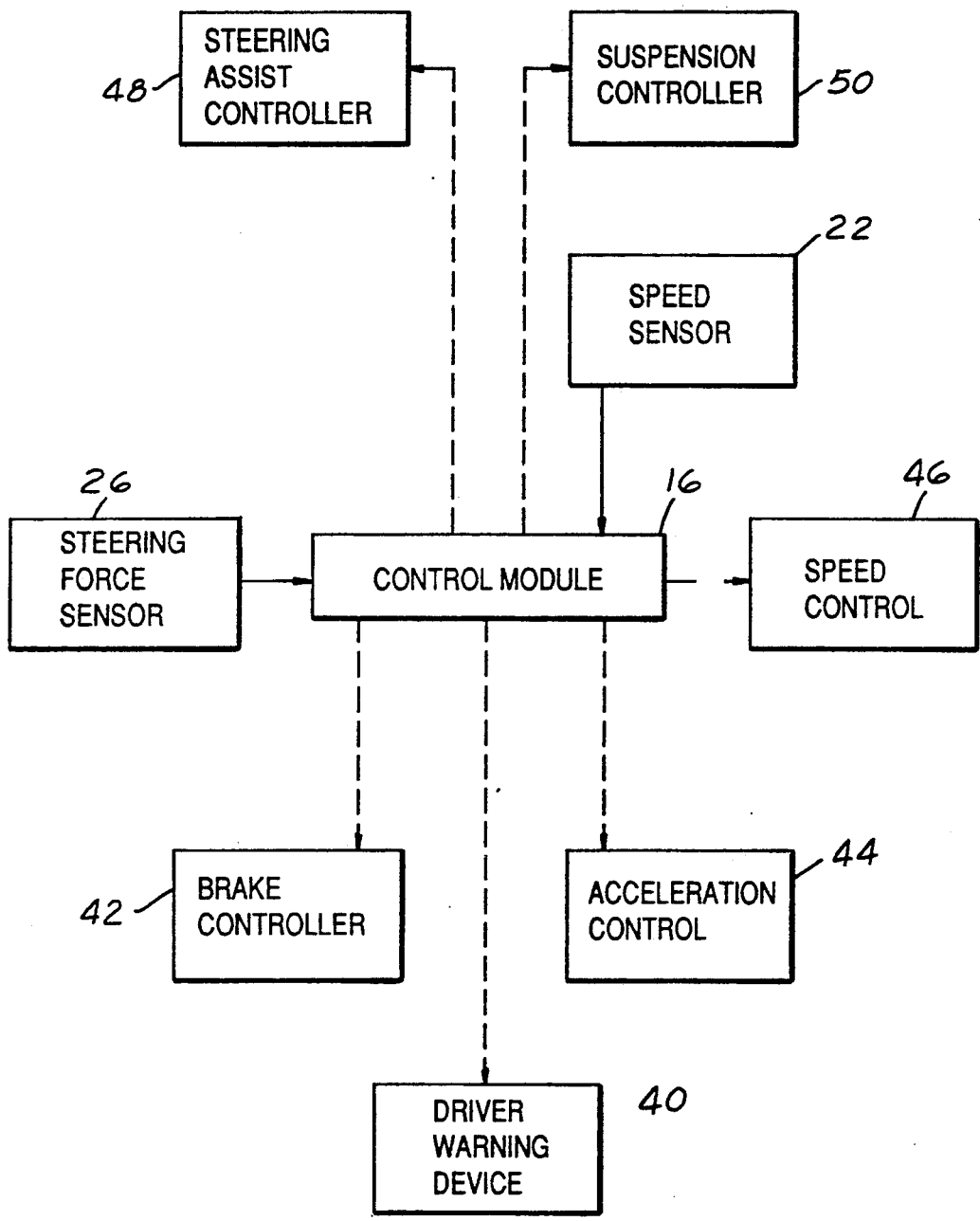
FIG. 2 is an overall apparatus block diagram in accordance with an embodiment of this invention.

As shown in FIGS. 1 and 2, a vehicle equipped with a system for dynamically determining centripetal force on a vehicle according to the present invention includes a plurality of road wheels 12, in this case four in number. A control module 16 receives signals from various sensors within the vehicle and operates various devices. The two principal sensors from which control module 16 receives information are speed sensor 22 and steering force sensor 26. Speed sensor 22 produces a signal representing the forward velocity of the vehicle, V. Although many types of automotive speed sensors are known, one type suitable for use with a system according to the present invention comprises a signal generator driven by the powertrain of the vehicle. One such type of signal generator presently used in Ford Motor Company vehicles comprises a variable reluctance alternating current generator. The present invention is not meant to be limited solely to the use of a variable reluctance alternating current generator to produce a first signal representing vehicle velocity.

Steering gear pressure sensor 26, in conjunction with control module 16, comprises means for producing a second signal representing the steering force, $F_S$, required to operate the steering system of the vehicle at any particular vehicle speed, V. As shown in FIG. 1, steering gear pressure sensor 26 is mounted upon the steering gear, or at least in close proximity thereto. The purpose of steering gear pressure sensor 26 is to measure the hydraulic pressure maintained by steering pump 20 and hydraulic pressure hoses 25. This pressure is directly relatable to the amount of steering force, $F_S$, required to keep the road wheels at any particular turn angle. The steering pressure sensor is operatively connected with control module 16 so that steering pressure information is provided on demand by the pressure sensor to the control module. The configuration of the pressure sensor could comprise any one of several known configurations operating according to a number of principles such as a piezoelectric sensor in which a crystal generates an electrical charge proportional to the pressure exerted upon the crystal, which is typically quartz. Those skilled in the art will appreciate in view of this disclosure that other types of pressure sensors such as those utilizing strain-gauge or electromagnetic principles, or variable capacitance diaphragm devices could be used. A discussion of such sensors is found in *Internal Combustion Engines*. International Textbook Company, 1968, at pgs. 147-153, which is hereby incorporated by reference.

Those skilled in the art will similarly appreciate in view of this disclosure that alternative means are available for measuring steering force in addition to the previously outlined pressure system. Accordingly, $F_S$, or steering force could be measured by means of a torque sensor for sensing the torque applied to the driveshaft of the steering gear. Such a torque sensor could comprise any one of a number of known devices using strain gauges, load cells, piezoelectric crystals or other devices. Finally, steering force could be measured using current and voltage data for the driving potential powering an electrically driven steering gear.

Figure 3:
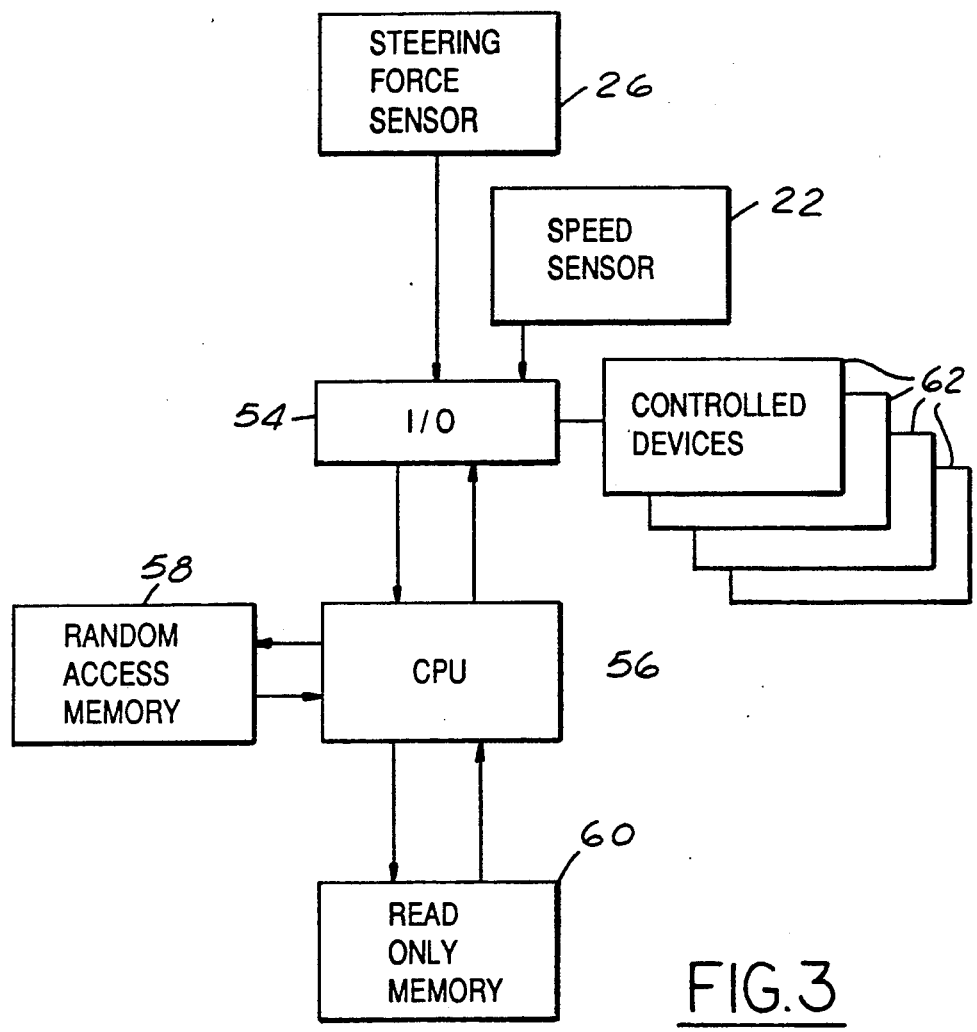
FIG. 3 is a block diagram showing a portion of a microprocessor which may be included in an apparatus according to the present invention, and interconnected sensors and controlled devices.

A processor means within control module 16 operates upon the data provided by the steering force sensor 26 and speed sensor 22 as follows. As shown in FIG. 3, data from the speed and steering force are fed into a central processor unit, 56, by means of input output circuits, 54. Those skilled in the art will appreciate in view of this disclosure that the central processor and its associated peripheral equipment could be structured according to several known architectures. In a preferred embodiment, however, the processor is configured so that a control program is sequentially read for each unit command from a read-only memory (ROM), 60, which stores preset control programs Unit commands are executed by the central processor. As previously noted, the Input/Output "I/O" device serves to connect the balance of the microprocessor of the other components of the system such as the sensors and control devices. The I/O device could contain signal conditioning circuits and devices such as filters for rejecting spurious signals. A random access memory (RAM), 58, stores data for use by the CPU. A number of different microprocessors could be used to practice the present invention such as the Model 8096 made by the Intel Corporation, or other microprocessors known in the art.

Figure 4:
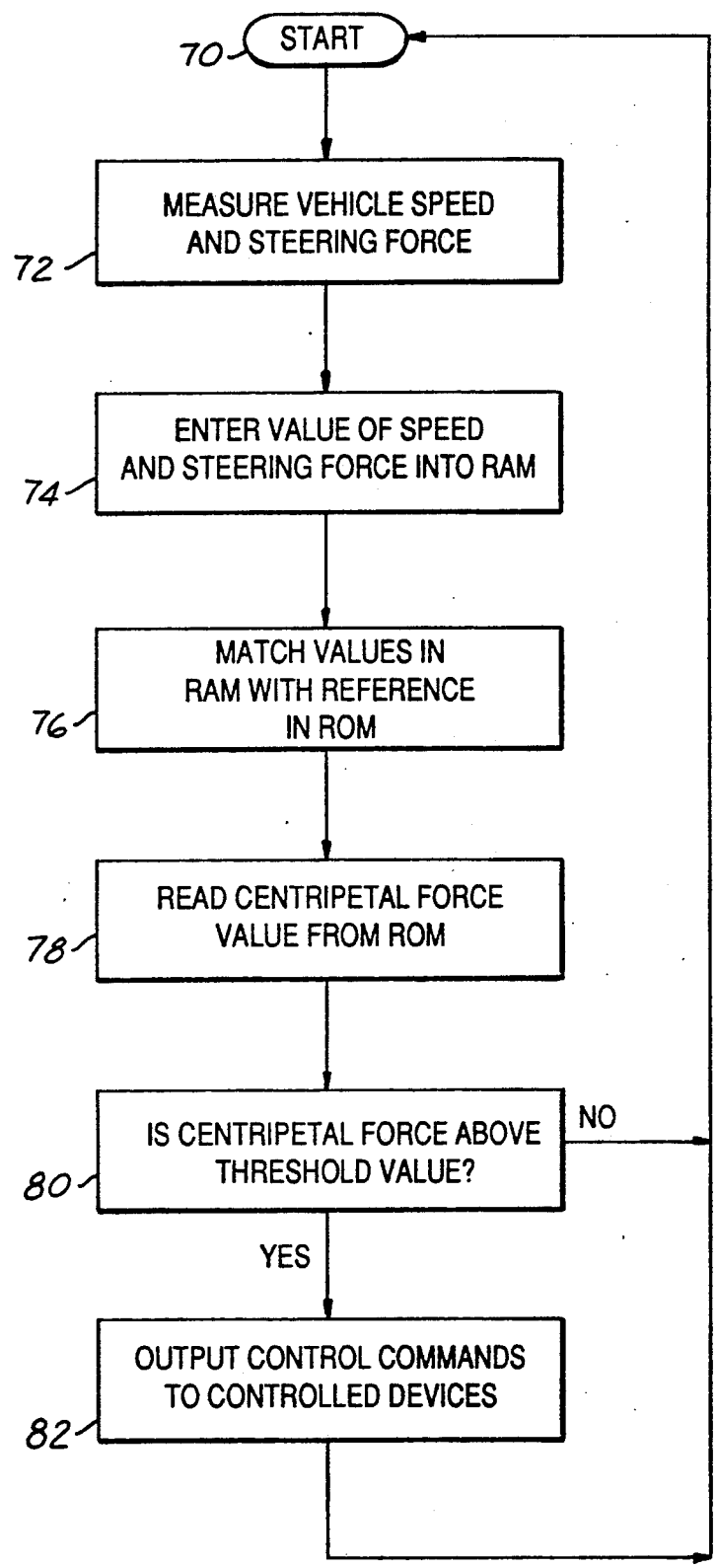
FIG. 4 is a logic flow block diagram in accordance with an embodiment of this invention.

The CPU uses data from the speed and steering force sensors according to the algorithm shown in FIG. 4 to find an actual centripetal force value. The algorithm therefore comprises a method for determining the centripetal force exerted on a vehicle and for initiating a control system within the vehicle when the centripetal force value exceeds a predetermined limit Beginning at block 72, control module 16 gives the order to measure vehicle speed, V, and steering force, $F_S$. At block 74, these values are entered into the RAM. At block 76, the processor matches the measured values for V and $F_S$ with one of a plurality of reference pairs within the ROM comprising predetermined values of V and $F_S$. Each of the reference pairs corresponds to a predetermined value of centripetal force, $F_{Cp}$. Having found an appropriate reference pair in which each of the values of V and $F_S$ is matched, the computer moves to block 80 wherein a question is asked—Is centripetal force above a threshold value? If the answer is "no", the computer continues to start block 70 and repeats the process. If, however, the answer to the question in block 80 is "yes", the computer will know that centripetal force lies above a predetermined value and that action should correspondingly be taken. Accordingly, at block 82 an output control command will be given to one or more controlled devices. The controlled devices labeled 62 in FIG. 3 will, thereafter be given commands by input/output device 54. After giving a control command at block 82, the processor will continue running the program represented by FIG. 4. If the answer to the question of block 80 subsequently becomes "no", the processor will cancel any control commands which had previously been issued.

Those skilled in the art will appreciate in view of this disclosure that a variety of threshold centripetal force values could be employed, with each of the threshold values corresponding to a different reference centripetal force level. A plurality of centripetal force values could be used as follows. First, in the event that a very high centripetal force value is sensed, the control module may give a signal to adjust the shock valving and/or spring rate. Accordingly, as shown in FIG. 2, control module 16 is connected to acceleration control 44. If an extremely high level of centripetal force is detected, driver warning device 40 may be activated. The driver warning device could comprise an alarm bell or warning lamp or other suitable device and the vehicle's power plant may be restrained to prevent or limit additional tire slippage.

An example will serve to further demonstrate operation of a system according to the present invention. First, assume that a vehicle with the present system is being operated upon smooth ice. When the vehicle is operated around a corner, the vehicle speed and steering force measuring means will measure these variables. Note, however, that the steering force, $F_S$, required to position the road wheels at a given turn angle and vehicle speed will usually be much less for smooth ice than for a dry asphaltic roadway. This is true because the road adhesion between the tire and an icy roadway will be very much lower than the situation when the vehicle is operated on a dry, hard surfaced road. In other words, the tire is slipping, and little force is required to position the tire at a given turn angle. In effect, the measured steering force is a measure of the lateral acceleration created by a lateral force input to the vehicle by the wheel and tire, and in the event that an icy roadway prevents the wheel and tire from creating a high level of lateral force input, a system according to the present invention will note this and determine that the centripetal force is a low value and that the variable rate shock absorbers do not need to be switched to a firmer setting. In fact, road adhesion between the vehicle roadwheels and the icy surface may be increased when the variable rate shock absorber is in a soft setting. It should be noted that operation of system according to the present invention is independent of the type of tire, or for that matter, whether the tire's tread is intact. This result stems from the fact that this system feeds back information about vehicle velocity and steering force to determine centripetal force. The use of the lookup table method for implementing a system such as that described herein allows "tuning" of the system to the individual characteristics of a particular vehicle, without the necessity of reworking equations contained within the CPU. Moreover, if a system according to the present invention is used with a variable assist power steering gear, it will likely be necessary to provide separate lookup table values for steering force levels corresponding to the various levels of power assist.

Figure 6:
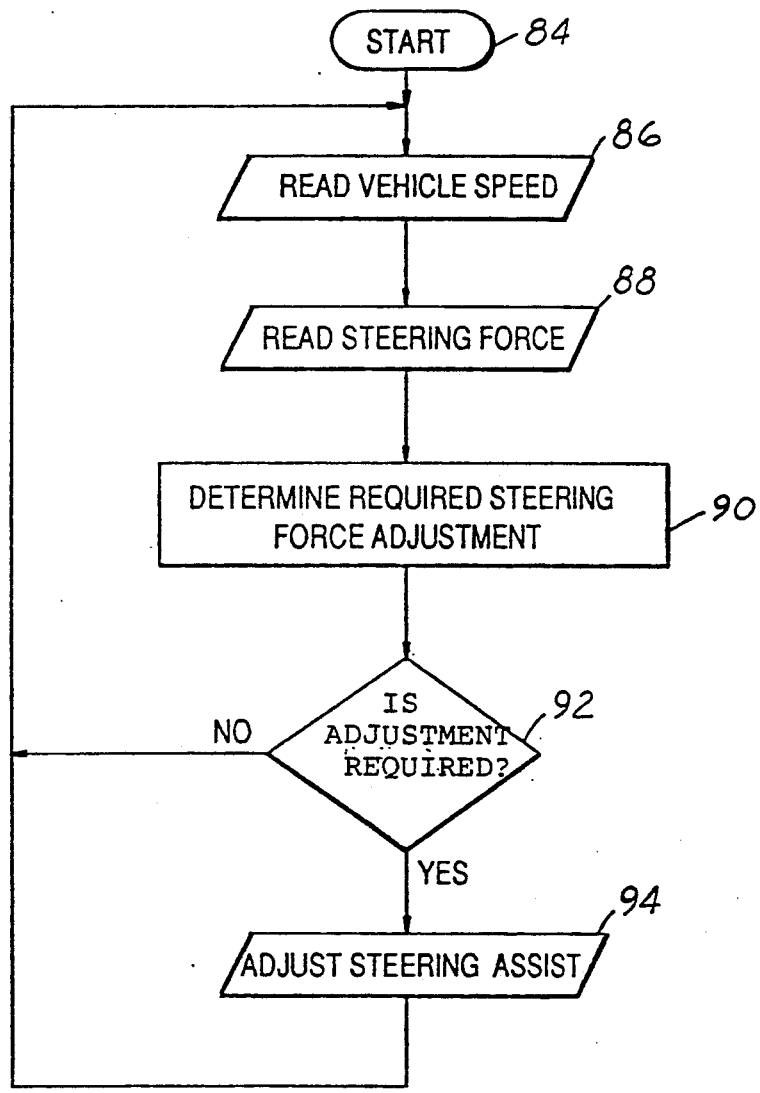
FIG. 6 is a logic flow block diagram of an alternative embodiment of the present invention.

In addition to the previously described lookup table scheme for determining centripetal force through the use of reference pairs, those skilled in the art will appreciate in view of this disclosure that the processor means may comprise means for operating upon the first and second signals produced by the sensors with a mathematical function contained in the processor. FIG. 6 illustrates an alternative logic flow diagram for a system of the present invention utilizing a mathematical equation in the CPU in determining when responsive action should be initiated by the vehicle. An example of an application utilizing a mathematical equation is illustrated in FIG. 6 which shows a method for controlling the steering assist controller 48 to change the amount of steering assist provided to the driver of the vehicle by the power steering system using only vehicle speed and steering force as the input variables. It should be recalled here that steering force is directly related to steering pressure as described above and it is contemplated by the present invention to determine steering pressure in a variety of known ways. The present invention is not meant to be limited solely to this example, it being readily apparent to one skilled in the art that other vehicle emergency systems as described above could employ a similar method.

Beginning at block 84 of FIG. 6, control module 16 gives the order to measure vehicle speed at block 86 and either steering force or steering pump pressure at block 88. As noted above, steering pump pressure is directly related to steering force in accordance with the present invention. The steering pump pressure increases as the force necessary to make a turn increases. For example, a turn on dry pavement requires more steering force than a turn on ice and this is evident by reading the steering pump pressure. Also as noted above, steering force can be measured in a variety of other known methods. As the centripetal force exerted on a vehicle increases, the amount of steering assist provided by the power steering system of the vehicle should increase. At block 90, the control module determines the required steering force adjustment based upon the vehicle speed and steering force readings in combination with a stored mathematical equation which is based on the rate of change of the steering assist adjustment per predetermined unit of time. At this step, the processor can determine the required power steering assist based either on the centripetal force exerted on the vehicle or by directly calculating the required value through a mathematical equation. If, at block 92, less steering assist is needed and a lower steering force required, the processor continues to block 94 and outputs a signal to a means for controlling the steering assist device which then adjusts the assist accordingly. If the answer is no at block 92, the processor continues to start block 84 and repeats the process. Accordingly, the driver could be offered increased feedback of road condition. In practice, the means for controlling the output of a power assist device or hydraulic pump associated with the steering system could comprise a valve for modulating the magnitude of the steering assistance provided by the power assist device.

The present invention provides a system superior to any system which functions by measuring steering angle because a high steering angle could still result in a low centripetal force on the vehicle. Depending upon the sensed level of centripetal force exerted on the vehicle, the control module of the present invention commands various systems of the vehicle to initiate responsive actions. In the event that a very high level of centripetal force is detected, steering assist controller 48, could be given a signal by control module 16 to increase the amount of boost provided by a power steering system. Also, for a high centripetal force, suspension controller 50 could be directed to adjust the level of damping produced by adjustable suspension units from a softer level to a relatively firmer level. Also, brake controller 42 could be directed to implement an antilock braking control mode depending upon the level of centripetal force measured by a system according to this invention.

Finally, speed control 46 could be given yet another signal by control module 16 to limit the maximum speed of the vehicle consistent with the sensed centripetal force conditions.

Various modifications and variations will, no doubt, occur to those skilled in the arts to which this invention pertains. For example, the computer architecture described herein may be modified according to the individual needs of the system being designed. This system could be constructed using analog circuit devices rather than the illustrated digital devices. Similarly, the choice of which systems to control as part of the emergency control means responsive to a signal indicating that centripetal force is greater than a threshold value is a choice within the province of the individual employing a system according to this invention. These and all other variations which basically rely on the teachings with which this disclosure has advanced the art are properly considered within the scope of this invention as defined by the following claims.

I claim

1. An apparatus for determining the centripetal force of an automotive vehicle operating on a roadway, comprising;
    vehicle speed measuring means comprising means for producing a first signal representing the speed at which said vehicle is being operated;
    steering force measuring means comprising means for producing a second signal representing the steering force required to operate the steering system of said vehicle at said measured vehicle speed; and
    processor means for determining the centripetal force of said vehicle, with said processor means comprising means for receiving said first and second signals and means for deriving from said signals a third signal representing the magnitude of said centripetal force.

2. An apparatus according to claim 1 wherein said processor means determines the centripetal force of said vehicle by matching measured vehicle speed and steering force with one of a plurality of reference pairs comprising vehicle speed and steering force values, where each of such reference pairs corresponds to a predetermined value of centripetal force.

3. An apparatus according to claim 2 wherein said processor means comprises a read-only memory containing said reference pairs and said third signal values.

4. An apparatus according to claim 1 wherein said processor means determines centripetal force by operating upon said first and second signals with a mathematical function contained in said processor.

5. An apparatus according to claim 1 wherein said vehicle speed measuring means comprises a signal generator driven by a powertrain of said vehicle.

6. An apparatus according to claim 1 wherein said steering force measuring means comprises a pressure transducer interposed between a steering gear for steering said road wheel and a hydraulic pump for powering said steering gear.

7. An apparatus according to claim 1 wherein said steering force measuring means comprises a torque sensor for sensing torque applied to a driveshaft of a steering gear for steering said road wheel.

8. A vehicle control apparatus, comprising:
    vehicle speed measuring means for measuring the speed of said vehicle and for producing a first signal representing said speed;
    steering force measuring means for measuring the steering force required to operate the steering system of said vehicle at said measured vehicle speed and for producing a second signal presenting said force;
    processor means for determining the centripetal force of said vehicle, with said processor means comprising means for receiving said first and second signals and means for deriving from said signals a third signal representing the magnitude of said centripetal force; and
    emergency control means responsive to said third signal for operating a control system within said vehicle.

9. An apparatus according to claim 8 wherein said control system comprises means for regulating the operation of a brake system incorporated in said vehicle.

10. An apparatus according to claim 8 wherein said emergency control system comprises means for warning the driver of said vehicle that centripetal force is greater than a predetermined value.

11. An apparatus according to claim 8 wherein said control system comprises means for limiting the maximum speed of the vehicle.

12. An apparatus according to claim 8 wherein said control system comprises means for limiting the maximum forward acceleration of the vehicle.

13. An apparatus according to claim 8 wherein said control system comprises means for operating an adjustable suspension system.

14. An apparatus according to claim 13 wherein said control system comprises means for controlling damping produced by said adjustable suspension system.

15. An apparatus according to claim 8 wherein said control system comprises means for controlling the output of a power assist device associated with said steering system.

16. An apparatus according to claim 15 wherein said means for controlling the output of a power assist device associated with said steering system comprises a valve for limiting the magnitude of the assist produced by said power assist device.

17. A method for determining the centripetal force exerted on an automotive vehicle and for initiating a control system within said automotive vehicle having roadwheels, comprising the steps of:
    measuring the speed of said vehicle;
    measuring the steering force required to turn said roadwheels of said vehicle;
    entering said vehicle speed and said steering force into a processor means;
    comparing said measured vehicle speed and said measured steering force with one of a plurality of reference pairs stored in said processor means, each one of said reference pairs comprising vehicle speed and steering force values corresponding to a predetermined centripetal force value; and
    initiating said control system within said vehicle when said centripetal force value exceeds a predetermined value.

18. A method according to claim 17, wherein said control system is operative to adjust the spring rate of a suspension unit of said vehicle.

19. A method according to claim 17, wherein said control system is operative to adjust the shock valving of a suspension unit of said vehicle.

20. A method according to claim 17, wherein said control system is operative to initiate a warning signal within said vehicle.

21. A method for controlling a steering assist device of a power steering system of an automotive vehicle having a pair of steerable roadwheels, comprising the steps of:

measuring the sped of said vehicle;

measuring the steering pressure within said steering system while turning said roadwheels of said vehicle, said pressure being measured by a pressure transducer;

determining a required steering assist value based upon said measured vehicle speed and said measured steering pressure; and adjusting sad power assist device of said power steering system to meet said required steering assist value.

* * * * *